US010981257B2

(12) United States Patent
Christie et al.

(10) Patent No.: US 10,981,257 B2
(45) Date of Patent: Apr. 20, 2021

(54) OPTICAL FIBER POLISHER WITH RAMPING FEATURES

(71) Applicant: Domaille Engineering, LLC, Rochester, MN (US)

(72) Inventors: Jill B. Christie, St. Charles, MN (US); Dennis J. Anderson, Zumbro Falls, MN (US); John P. Hagen, Plainview, MN (US); Gregory A. Schumacher, Plainview, MN (US); Dean A. Krueger, Dodge Center, MN (US); Timothy E. Kanne, Rochester, MN (US)

(73) Assignee: Domaille Engineering, LLC, Rochester, MN (US)

( * ) Notice: Subject to any disclaimer, the term of this patent is extended or adjusted under 35 U.S.C. 154(b) by 0 days.

(21) Appl. No.: 16/803,471

(22) Filed: Feb. 27, 2020

(65) Prior Publication Data
US 2020/0278500 A1    Sep. 3, 2020

Related U.S. Application Data

(60) Provisional application No. 62/812,661, filed on Mar. 1, 2019.

(51) Int. Cl.
*B24B 19/22*    (2006.01)
*G02B 6/38*    (2006.01)
*B24B 51/00*    (2006.01)

(52) U.S. Cl.
CPC ............ *B24B 19/226* (2013.01); *B24B 51/00* (2013.01); *G02B 6/3863* (2013.01)

(58) Field of Classification Search
None
See application file for complete search history.

(56) References Cited

U.S. PATENT DOCUMENTS

| 4,587,768 | A | * | 5/1986 | Doyle | B24B 27/0076 |
| | | | | | 451/11 |
| 2003/0036342 | A1 | * | 2/2003 | Yamada | B24B 19/226 |
| | | | | | 451/66 |
| 2003/0060141 | A1 | * | 3/2003 | Sommer | B24B 51/00 |
| | | | | | 451/42 |
| 2003/0182015 | A1 | * | 9/2003 | Domaille | B24B 49/16 |
| | | | | | 700/164 |

FOREIGN PATENT DOCUMENTS

JP    3-178763 A    *    8/1991

OTHER PUBLICATIONS

Domaille Engineering, APM-HDC-5300 Series Fiber Optic Polishing Machine User's Guide, Edition 2, Nov. 2014. Retrieved from https://cms.cws.net/content/domailleengineering.com/files/products/polishing-machines/Domaille-5300-manual.pdf. (Year: 2014).*

* cited by examiner

*Primary Examiner* — Michael Stahl

(74) *Attorney, Agent, or Firm* — Dicke, Billig & Czaja, PLLC

(57) ABSTRACT

An optical fiber polisher includes a polishing mechanism, a platen, and a memory for storing operational parameters entered by a user. The optical fiber polisher includes a processor to control a pressure applied by the polishing mechanism and a rotational speed of the platen, including causing a ramping down of at least one of the pressure and the rotational speed based on the operational parameters.

18 Claims, 7 Drawing Sheets

OPTICAL FIBER POLISHER WITH RAMPING FEATURES

CROSS-REFERENCE TO RELATED APPLICATIONS

This application claims the benefit of U.S. Provisional Application Ser. No. 62/812,661, filed Mar. 1, 2019, which is incorporated in its entirety herein by reference.

BACKGROUND OF THE INVENTION

A fiber optic cable generally includes a protective or supporting material through which optical fibers extend. The cables or ribbons typically have connectors located on each end to connect them to other fiber optic cables or ribbons or to peripheral devices, and the connectors are high precision devices that position the optical fibers for optimal connection.

In order to pass light signals thru optical fibers, the end face of the connector (from which a ferrule and optical fibers extend) must abut an adjacent connector in a specific manner. The high tolerances required of the parts to make these connections lead to precise shaping of the ends of the optical fibers via cleaving, cutting, and/or polishing. Apex offset, radius of curvature, fiber protrusion/recession, and angularity are all geometric parameters of optical fiber ends face that play into the quality of the signal passing thru the ribbon. Final test measurements for back reflection and insertion loss are typically used as the final checks to determine the quality of the geometry (as well as the alignment, cleanliness, and surface finish of the finished cable.) As such, the end face is usually cleaved, cut and/or polished to exacting standards so as to produce a finished product with minimal back reflection and loss. For example, it is often necessary to cleave, cut, and/or polish the end face of the connector to a precise length, i.e., so the end face projects a predetermined amount from a reference point such as a shoulder on the fiber optic connector within a predetermined tolerance. Fiber optic cables having multiple optical fibers can also be cleaved, cut, and/or polished to produce a particular performance specification.

Optical fiber polishers typically include a rotating platen and a polishing mechanism, such as a polishing arm mechanism, that positions and supports the connectors during the polishing process. Typically, the end face is lowered onto a film resting on the platen, and depending upon the film, the speed of the platen, the pressure applied, and its duration, acquires a product suitable for a particular application. Optical fiber polishers generally include a fixture coupled to the arm mechanism that is capable of holding and gripping one or more fiber optic connectors and advancing them under controlled conditions of speed and force to engage a plurality of fiber optic ends into engagement with a polishing member such as a rotatable platen having an abrasive surface (e.g., having a film with an abrasive surface positioned thereon).

The manufacturing process for building a finished fiber optic connector typically involves polishing it at various speeds and pressures using various polishing film sizes. Typically, the process will start with a more aggressive film of higher abrasive particle size at lower speeds and pressures and work towards smaller particle size films at faster speeds and higher pressures. How the polishing steps start and stop are critical in that the fragile fibers are under higher stress levels at those times.

For the reasons stated above and for other reasons stated below, which will become apparent to those skilled in the art upon reading and understanding the present specification, there is a need in the art for an improved optical fiber polisher that includes ramping features.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, an optical fiber polisher comprises a polishing mechanism, a platen, and a memory for storing operational parameters entered by a user. The optical fiber polisher includes a processor to control a pressure applied by the polishing mechanism and a rotational speed of the platen, including causing a ramping down of at least one of the pressure and the rotational speed based on the operational parameters.

BRIEF DESCRIPTION OF THE DRAWINGS

The present invention can be more easily understood, and further advantages and uses thereof can be more readily apparent, when considered in view of the detailed description and the following Figures in which.

In accordance with common practice, the various described features are not drawn to scale but are drawn to emphasize specific features relevant to the present invention. Reference characters denote like elements throughout the Figures and the text.

DETAILED DESCRIPTION OF THE INVENTION

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

Embodiments of the present invention provide an optical fiber polisher including a polishing mechanism, a platen, and a memory for storing operational parameters entered by a user. The optical fiber polisher includes a processor to control a pressure applied by the polishing mechanism and a rotational speed of the platen, including causing a ramping down of at least one of the pressure and the rotational speed based on the operational parameters.

Figure 1:
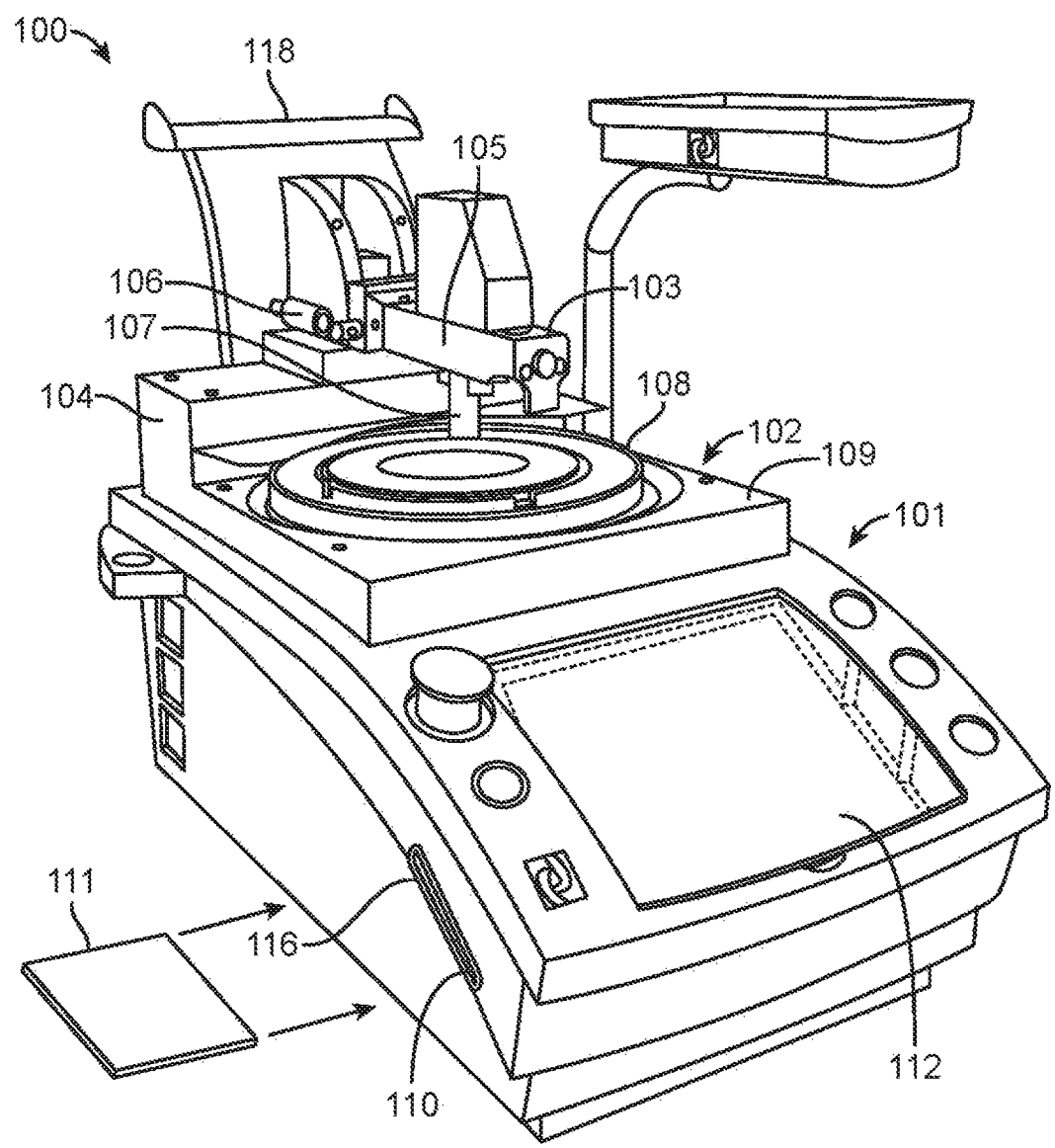
FIG. 1 is a perspective view of an optical fiber polisher according to one embodiment.

FIG. 1 is a perspective view of an optical fiber polisher 100 according to one embodiment. This type of optical fiber polisher 100 is shown and described in U.S. Pat. Nos. 7,738,760 and 8,708,776, which are hereby incorporated by reference, and is Optical Fiber Polishing Machine APM Model HDC-5300 by Domaille Engineering, LLC of Rochester, Minn. Although optical fiber polisher 100 is generally shown and described, it is recognized that other suitable types of polishers could be used with the present invention.

Generally, the polisher 100 includes a polishing unit 102 comprising a pneumatic overarm assembly 103, a platen assembly 108 rotatably supported by a stage 109, a processor 202 (FIG. 2), a porting device 110 for a portable memory device 111, and an input device 112. A housing 101 supports and aligns the polishing unit 102, the processor 202, and the input device 112 in an operative position. A slot 116 is inserted along one side of the housing 101 to allow the portable memory device 111 to access the porting device 110. A cable management attachment 118 is connected to the back of the housing 101 for supporting fiber optic cables undergoing a polishing process.

The pneumatic overarm assembly 103 includes an overarm 105 hingedly secured along one end to a base 104, the overarm 105 rotatable about the hinged end. A pair of pneumatic cylinders 106 is coupled to the overarm 105, opposing rotational movement thereof. A mounting pole 107 extends downward from the overarm 105 and is configured and arranged, as is well known in the art, to connect to a mounting tube of a fixture.

The polisher 100 maintains rigid control of each polishing process through feedback mechanisms that control the operation of both the platen assembly 108 and the pneumatic overarm assembly 103. The feedback mechanisms communicate with the processor 202 to continuously monitor the performance of the platen assembly 108 and the pneumatic overarm assembly 103 and ensure that both are functioning at their set levels. In some embodiments, the processor 202 communicates with the porting device 110, the input device 112, and a USB port for a keyboard to enable rapid programming of the polisher 100. The input device 112 also serves as a visual indicator of actual operating parameters. In operation according to one embodiment, processor 202 causes platen assembly 108 to rotate, and causes overarm 105 to apply a downward force on a fixture holding one or more fiber optic connectors, which causes the end faces of the fiber optic connectors to be lowered onto a polishing film resting on the rotating platen 108.

Figure 2:
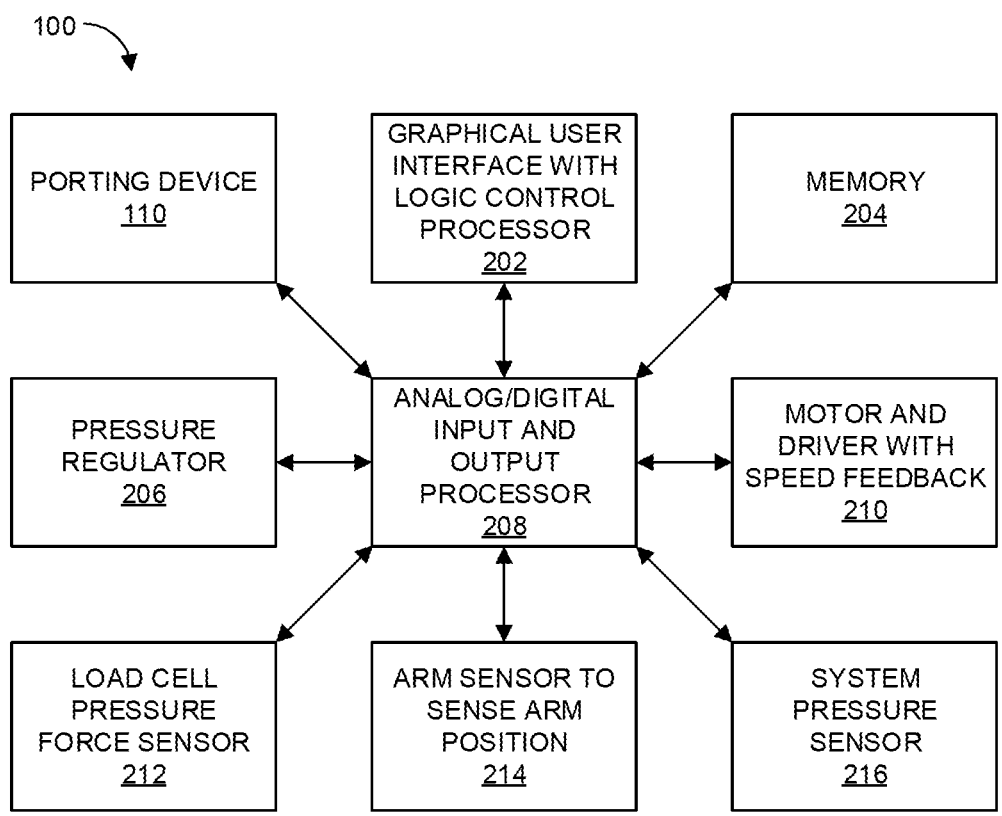
FIG. 2 is an electrical block diagram illustrating elements of the optical fiber polisher shown in FIG. 1 according to one embodiment.

FIG. 2 is an electrical block diagram illustrating elements of the optical fiber polisher 100 shown in FIG. 1 according to one embodiment. Optical fiber polisher 100 includes porting device 110, graphical user interface with logic control processor 202 (also referred to herein as "processor 202"), memory 204, pressure regulator 206, analog/digital input and output processor 208, motor and driver with speed feedback 210, load cell pressure force sensor 212, arm sensor 214, and system pressure sensor 216.

Graphical user interface with logic control processor 202 includes a Central Processing Unit (CPU) or another suitable processor. In one example, memory 204 stores machine readable instructions executed by the processor for operating polisher 100. Memory 204 includes any suitable combination of volatile and/or non-volatile memory, such as combinations of Random Access Memory (RAM), Read-Only Memory (ROM), flash memory, and/or other suitable memory. These are examples of non-transitory computer readable storage media. The memory 204 is non-transitory in the sense that it does not encompass a transitory signal but instead is made up of at least one memory component to store machine executable instructions for performing techniques described herein. Memory 204 may store one or more modules, and the processor may execute instructions of the modules to perform techniques described herein.

In one example, the various subcomponents or elements of the polisher 100 may be embodied in a plurality of different systems, where different modules may be grouped or distributed across the plurality of different systems. To achieve its desired functionality, polisher 100 may include various hardware components. Among these hardware components may be a number of processing devices, a number of data storage devices, a number of peripheral device adapters, and a number of network adapters. These hardware components may be interconnected through the use of a number of busses and/or network connections. The processing devices may include a hardware architecture to retrieve executable code from the data storage devices and execute the executable code. The executable code may, when executed by the processing devices, cause the processing devices to implement at least some of the functionality disclosed herein.

In one embodiment, the processor 202 communicates with porting device 110 for a portable memory device 111. The porting device 110 may include a slot for supporting communication between the processor 202 and a card. The porting device 110 may be any device used to support communication between the processor 202 and a portable memory device. The porting device 110 may include, but is not limited to, USB, a CDROM drive, a memory slot, a disk drive, and a hard drive.

In one embodiment, the input device 112 shown in FIG. 1 includes a graphical user interface with logic control processor 202 to receive user input. The input device 112 comprises an interactive display system in which a touch-sensitive screen is used as a projection surface. Control signals are generated by the touch-sensitive screen responsive to user applied pressure. The user can enter and edit information by touching the screen. The polisher 100 may also include a USB port that connects to a keyboard to receive user input. It is not intended that this disclosure be limited by the above-described input devices. A person skilled in the art can readily appreciate that there are a number of input devices that can be implemented to allow a user to interface with the processor, including a keypad, a mouse, a switch, and buttons.

To perform a polishing process, operational parameters such as process time, platen speed, pressure, film type, pad type, and lubricant type may be entered for each step of the polishing process. The process of inputting this information into the polisher 100 may be performed by scrolling through a plurality of screens on the input device 112 and selecting from a menu of parameters. Once inputted, the procedure can be saved into memory 204 and used by the processor 202 at a later date. Alternatively, the porting device 110 may be utilized to download an inputted polishing procedure onto a portable memory device 111. Once stored onto a portable memory device 111, the polishing process can be downloaded onto another polisher device, or downloaded onto a computer wherein the process may be transported to another site, such as by e-mail.

The processor 202 communicates with a plurality of sensors and feedback mechanisms to monitor and control the polishing process in accordance with the operational parameters entered by a user. The processor 202 communicates with elements of the polisher 100 to control polishing fixture pressure, platen rotational speed, and duration of the polishing process. The arm sensor 214 senses the position of the overarm 105, and transmits this sensed information to the processor 202 via processor 208. The system pressure sensor 216 continually senses the air pressure entering the polisher 100, and transmits this sensed information to the processor 202 via the processor 208. Based on this information, the processor 202 may determine a current air pressure. The processor 202 may then determine if the current air pressure is greater than an upper threshold or less than a lower threshold, in which case the processor 202 may generate an alarm signal.

Processor 202 may automatically adjust arm contact pressure based on operational parameters entered by a user. Processor 202 may continually adjust the pressure applied by the overarm 105 through a feedback mechanism that includes the load cell pressure force sensor 212. The load cell pressure force sensor 212 continually senses the amount of force the overarm 105 is applying downward on the fiber optic connector holding fixture, and transmits this sensed information to the processor 202 via the processor 208. Based on this information, the processor 202 may determine a current contact pressure. The processor 202 may then determine if the current contact pressure is greater or less than the user-selected pressure for the polishing procedure. The processor 202 corrects any deviations by communicating with the pressure regulator 206, and causing the pressure regulator 206 to increase or decrease the flow of air into the cylinders 106, which correspondingly increases or decreases the downward force applied by the overarm 105.

Processor 202 may automatically adjust platen speed based on operational parameters entered by a user. Processor 202 may continually adjust the rotational speed of the platen 108 through a feedback mechanism that includes the motor and driver with speed feedback 210. The motor and driver with speed feedback 210 continually senses the rotational speed of the platen 108, and transmits this sensed information to the processor 202 via the processor 208. Based on this information, the processor 202 may determine a current rotational speed value. The processor 202 may then determine if the current rotational speed value is greater or less than the user-selected speed for the polishing procedure. The processor 202 corrects any deviations by communicating with the motor and driver with speed feedback 210 to increase or decrease the rotational speed of the platen 108.

The manufacturing process for building a finished fiber optic connector typically involves polishing it at various speeds and pressures using various polishing film sizes. Typically, the process will start with a more aggressive film of higher abrasive particle size at lower speeds and pressures and work towards smaller particle size films at faster speeds and higher pressures. How the polishing steps start and stop are critical in that the fragile fibers are under higher stress levels at those times. If a sharp somewhat pointed fiber is stuck into a polishing film and it starts moving too suddenly under too high of a pressure, then the fiber may crack or break off. In similar fashion, as the polishing step finishes and the polishing machine comes to a stop, it is better to slowly and gradually drop the pressure and speed as to minimize the amount of side loaded forces that are seen by the fiber optic as things decelerate. Stopping suddenly can jar the fragile glass pieces and can crack them.

To address these issues, the operational parameters of polisher 100 that may be entered by a user include parameters that allow the user to ramp up the pressure and speed at the beginning of each polishing step, ramp down the pressure and speed at the end of each polishing step, and also to start the movement of the polishing platen before applying pressure to the fixture or stop the rotating platen after the pressure has been ramped down or totally removed. The operational parameters allow the user to program in a pressure ramp and pressure drop at the start and end of each of the polishing steps, as well as a platen speed ramp and drop. These are all individual parameters that the user can program for as long as a maximum ramp duration (e.g., 20 seconds). Pressure can be ramped up to a user-specified maximum pressure value within an allowed pressure range (e.g., 0-16 lbs.) across a user-specified pressure ramp up duration (e.g., 0-20 seconds), as well as be ramped down across a user-specified pressure ramp down duration (e.g., 0-20 seconds). Similarly, the platen speed can be ramped up to a user-specified maximum speed value within an allowed speed range (e.g., 0-200 RPM) across a user-specified speed ramp up duration (e.g., 0-20 seconds), as well as be ramped down across a user-specified speed ramp down duration (e.g., 0-20 seconds).

In one embodiment, processor 202 uses a linear scaling to perform the ramp up and ramp down of pressure and speed. For example, the processor 202 may divide the magnitude of the total ramp up or total ramp down by the duration of the ramp up or ramp down, and then raise or drop the speed/pressure as needed per time interval (e.g., once per second) to achieve the user-specified linear ramp.

In one embodiment, the operational parameters of polisher 100 that may be entered by a user include at least one parameter that allows the user to start the polishing platen 108 prior to applying downward pressure to the fixture. This feature helps reduce side loaded forces on the fragile fiber optic components when starting the polishing processes. By starting the rotating platen 108 first before downward pressure is applied to the fiber holding fixture, the fibers will have lower applied stresses at startup. Because of the lower stresses, they will have a lower likelihood of cracking from the higher static frictional forces holding them in position. In one embodiment, the user-specified operational parameters allow the user to delay the downward pressure forces for a user-specified delay period within an allowed delay period range (e.g., 0-20 seconds) while the rotational ramp of the polishing platen begins.

In one embodiment, the operational parameters of polisher 100 that may be entered by a user include at least one parameter that allows the user to select, for each polishing step, the rotational motion direction (e.g., either clockwise or counterclockwise) of the polishing platen 108 for that polishing step. In one embodiment, the at least one parameter to select the rotational motion direction has a default value indicating a clockwise rotational motion direction for all polishing steps, but this default may be changed by a user to a counterclockwise rotational motion direction for any or all of the polishing steps.

In one embodiment, the operational parameters of polisher 100 that may be entered by a user include at least one parameter that allows the user to select, for each polishing step after the first polishing step, whether that polishing step will be automatically started upon the completion of the immediately preceding polishing step. In one embodiment, the at least one parameter to select whether the polishing step will automatically start has a default value indicating that the polishing step will not automatically start (i.e., the step must be manually initiated by the user after completion of the preceding polishing step). Thus, none of the polishing steps will start automatically unless the user changes the default value for any or all of the polishing steps after the first polishing step. In one embodiment, the default value for the first polishing step is not changeable, and is always manually started.

Figure 3:
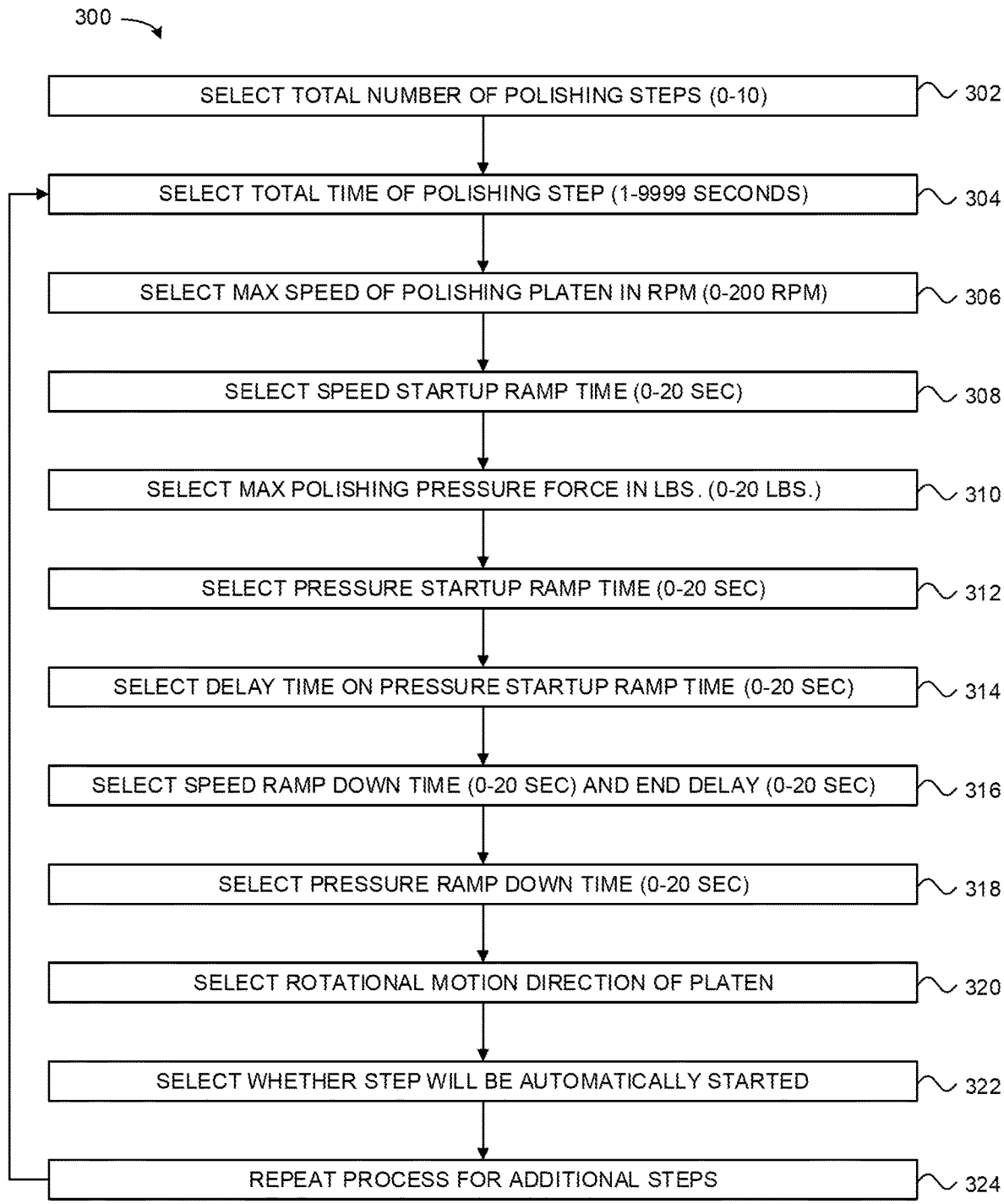
FIG. 3 is a flow diagram illustrating a method for entering operational parameters and generating a polishing recipe for the optical fiber polisher shown in FIG. 1 according to one embodiment.

FIG. 3 is a flow diagram illustrating a method 300 for entering operational parameters and generating a polishing recipe for the optical fiber polisher 100 shown in FIG. 1 according to one embodiment. At 302 in method 300, the graphical user interface 202 prompts a user to select a total number of polishing steps (e.g., 0-10 steps) to be performed by polisher 100. After the selection at 302, the method 300 moves to 304, where the graphical user interface 202 prompts a user to select a total time of the polishing step (e.g., 1-9999 seconds). After the selection at 304, the method 300 moves to 306, where the graphical user interface 202 prompts a user to select the maximum (max) speed of the polishing platen 108 in RPM (e.g., 0-200 RPM). After the selection at 306, the method 300 moves to 308, where the graphical user interface 202 prompts a user to select the speed startup ramp time (e.g., 0-20 seconds). After the selection at 308, the method 300 moves to 310, where the graphical user interface 202 prompts a user to select the maximum polishing pressure force in pounds (lbs) (e.g., 0-20 lbs). After the selection at 310, the method 300 moves to 312, where the graphical user interface 202 prompts a user to select a pressure startup ramp time (e.g., 0-20 seconds). After the selection at 312, the method 300 moves to 314, where the graphical user interface 202 prompts a user to select a delay time on pressure startup ramp time (e.g., 0-20 seconds). After the selection at 314, the method 300 moves to 316, where the graphical user interface 202 prompts a user to select a speed ramp down time (e.g., 0-20 seconds) and an end delay value (e.g., 0-20 seconds). After the selections at 316, the method 300 moves to 318, where the graphical user interface 202 prompts a user to select a pressure ramp down time (e.g., 0-20 seconds). After the selection at 318, the method 300 moves to 320, wherein the graphical user interface 202 prompts a user to select a rotational motion direction (e.g., clockwise or counterclockwise) of the polishing platen 108. After the selection at 320, the method 300 moves to 322, wherein the graphical user interface 202 prompts a user to select whether the current polishing step will be automatically started upon completion of the immediately preceding polishing step. After the selection at 322, the method 300 moves to 324, which indicates that the process is repeated for additional polishing steps, and the method 300 returns to 304.

The operational parameters entered by a user in method 300 represent a recipe for polishing, which is used by processor 202 to cause polisher 100 to perform a polishing process in accordance with the parameters. Processor 202 causes the polisher 100 to perform the number of polishing steps selected at 302 in method 300, with each step lasting a duration specified at 304 in method 300. For each of the polishing steps, processor 202 ramps up the rotational speed of the platen 108 from 0 RPM to the maximum speed value entered at 306 over a period of time specified at 308. For each of the polishing steps, processor 202 ramps up the downward pressure force applied by the overarm 105 from 0 lbs to the maximum polishing pressure force value entered at 310 over a period of time specified at 312. If a user selects zero for the delay value at 314, the processor 202 causes the ramp up of the downward pressure force to begin at the same time as the ramp up of the rotational speed of the platen 108. If a user selects a non-zero value for the delay value at 314, the processor 202 causes the start of the ramp up of the downward pressure force to be delayed by that non-zero value after the start of the ramp up of the rotational speed of the platen 108.

At the end of each of the polishing steps, processor 202 ramps down the rotational speed of the platen 108 from the speed value entered at 306 to 0 RPM over the ramp down period of time specified at 316. At the end of each of the polishing steps, processor 202 ramps down the downward pressure force applied by the overarm 105 from the pressure value entered at 310 to 0 lbs over the period of time specified at 318. If a user selects zero for the end delay at 316, the ramp down of the platen speed and the ramp down of the pressure end at the same time. If a user selects a non-zero value for the end delay at 316, the ramp down of the platen speed ends by the selected non-zero number of seconds after the end of the ramp down of the pressure. For each polishing step, the rotational motion direction of the platen 108 is determined by the selection made by the user at 320. For each polishing step, whether that polishing step is automatically started upon completion of the preceding polishing step is determined by the selection made by the user at 322.

Figure 4:
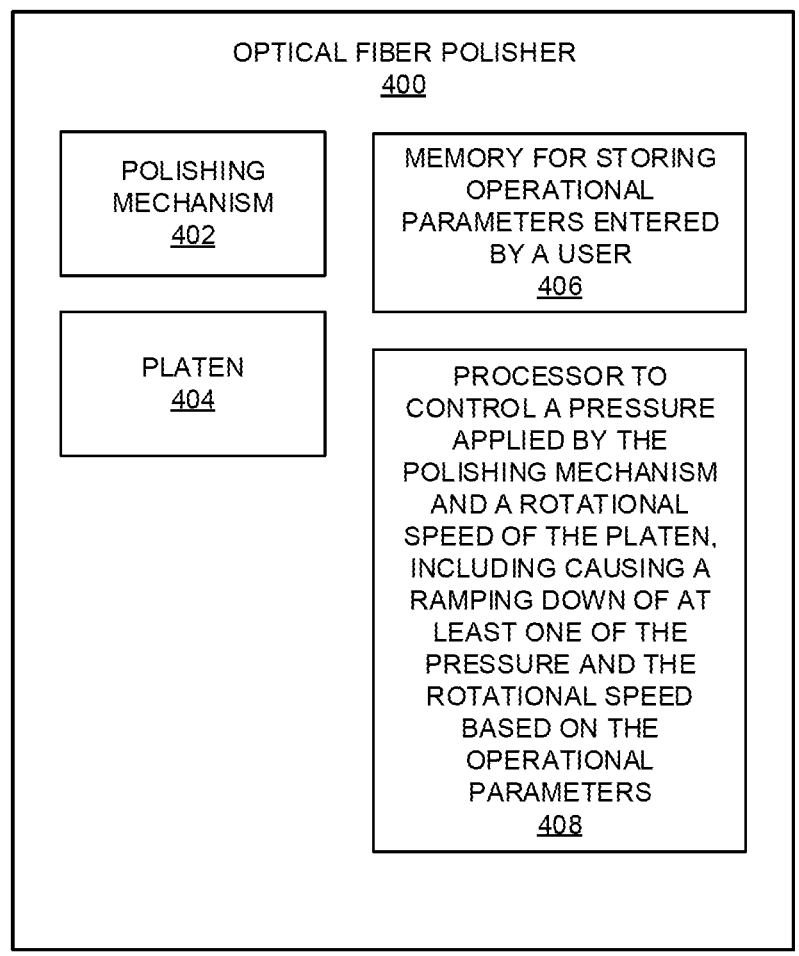
FIG. 4 is a block diagram illustrating an optical fiber polisher according to one embodiment.

One embodiment of the present disclosure is directed to an optical fiber polisher. FIG. 4 is a block diagram illustrating an optical fiber polisher 400 according to one embodiment. Optical fiber polisher 400 includes a polishing mechanism 402, a platen 404, a memory 406 for storing operational parameters entered by a user, and a processor 408 to control a pressure applied by the polishing mechanism and a rotational speed of the platen, including causing a ramping down of at least one of the pressure and the rotational speed based on the operational parameters.

The processor 408 may cause a ramping down of the pressure based on the operational parameters. The processor 408 may cause a ramping down of the rotational speed based on the operational parameters. The processor 408 may cause a ramping down of both the pressure and the rotational speed based on the operational parameters. The operational parameters may include a speed ramp down time, and the processor 408 may cause the ramping down of the rotational speed over a time period defined by the speed ramp down time. The operational parameters may include a pressure ramp down time, and the processor 408 may cause the ramping down of the pressure over a time period defined by the pressure ramp down time. The operational parameters may include a delay parameter, and the processor 408 may cause an ending of the ramping down of the rotational speed to occur later in time than an ending of the ramping down of the pressure based on the delay parameter. The processor 408 may cause a ramping up of the pressure and the rotational speed based on the operational parameters. The operational parameters may include a delay parameter, and the processor 408 may cause a beginning of the ramping up of the pressure to occur later in time than a beginning of the ramping up of the rotational speed based on the delay parameter. The operational parameters may include a rotational motion direction parameter, and the processor 408 may control a rotational motion direction of the platen 404 based on the rotational motion direction parameter. The optical fiber polisher 400 may be configured to perform a polishing process in a plurality of polishing steps, and each of the polishing steps may include a set of operational parameters that may vary from operational parameters of other ones of the polishing steps. The set of operational parameters for each of the polishing steps may include a rotational motion direction parameter, and the processor 408 may select, for each of the polishing steps, either a clockwise rotation or a counterclockwise rotation of the platen 404 based on the rotational motion direction parameter for that polishing step. The set of operational parameters for at least a subset of the polishing steps may include an auto start parameter indicating whether that polishing step should start automatically upon completion of an immediately preceding polishing step.

Figure 5:
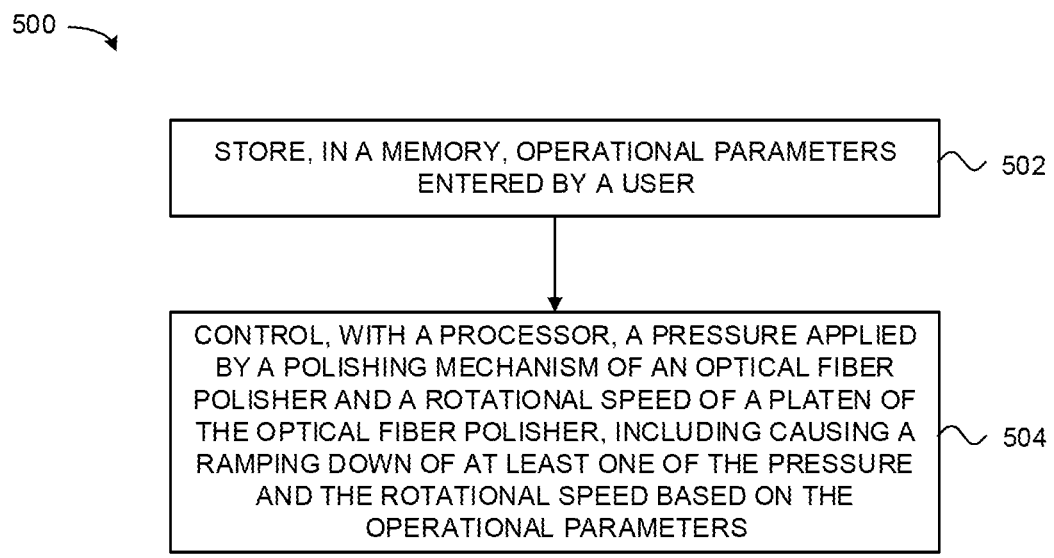
FIG. 5 is a flow diagram illustrating a method of optical fiber polishing according to one embodiment.

Another embodiment of the present disclosure is directed to a method of optical fiber polishing. FIG. 5 is a flow diagram illustrating a method 500 of optical fiber polishing according to one embodiment. The method 500 includes, at 502, storing, in a memory, operational parameters entered by a user. The method 500 includes, at 504, controlling, with a processor, a pressure applied by a polishing mechanism of an optical fiber polisher and a rotational speed of a platen of the optical fiber polisher, including causing a ramping down of at least one of the pressure and the rotational speed based on the operational parameters.

The operational parameters in method 500 may include a speed ramp down time, and the method 500 may further include causing, with the processor, the ramping down of the rotational speed over a time period defined by the speed ramp down time. The operational parameters in method 500 may include a pressure ramp down time, and the method 500 may further include causing, with the processor, the ramping down of the pressure over a time period defined by the pressure ramp down time. The operational parameters in method 500 may include a rotational motion direction parameter, and the method 500 may further include controlling, with the processor, a rotational motion direction of the platen based on the rotational motion direction parameter. The optical fiber polisher in method 500 may be configured to perform a polishing process in a plurality of polishing steps, and each of the polishing steps may include a set of operational parameters that may vary from operational parameters of other ones of the polishing steps, and the set of operational parameters for at least a subset of the polishing steps may include an auto start parameter indicating whether that polishing step should start automatically upon completion of an immediately preceding polishing step.

Figure 6:
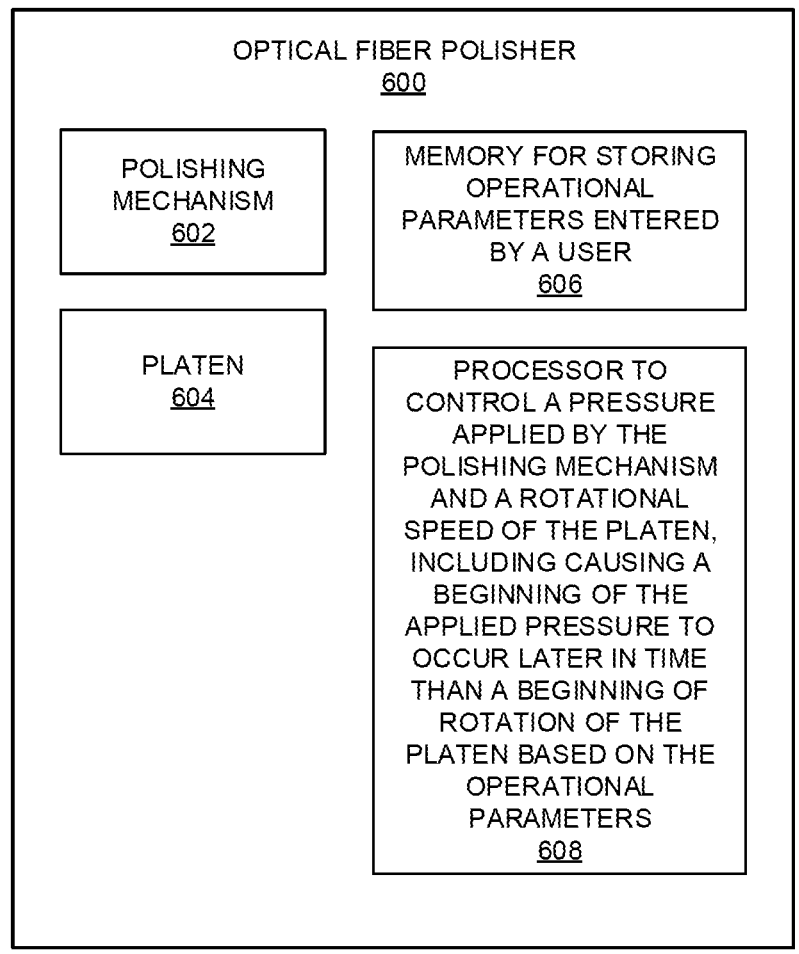
FIG. 6 is a block diagram illustrating an optical fiber polisher according to another embodiment.

Another embodiment of the present disclosure is directed to an optical fiber polisher. FIG. 6 is a block diagram illustrating an optical fiber polisher 600 according to another embodiment. Optical fiber polisher 600 includes a polishing mechanism 602, a platen 604, a memory 606 for storing operational parameters entered by a user, and a processor 608 to control a pressure applied by the polishing mechanism and a rotational speed of the platen, including causing a beginning of the applied pressure to occur later in time than a beginning of rotation of the platen based on the operational parameters.

Figure 7:
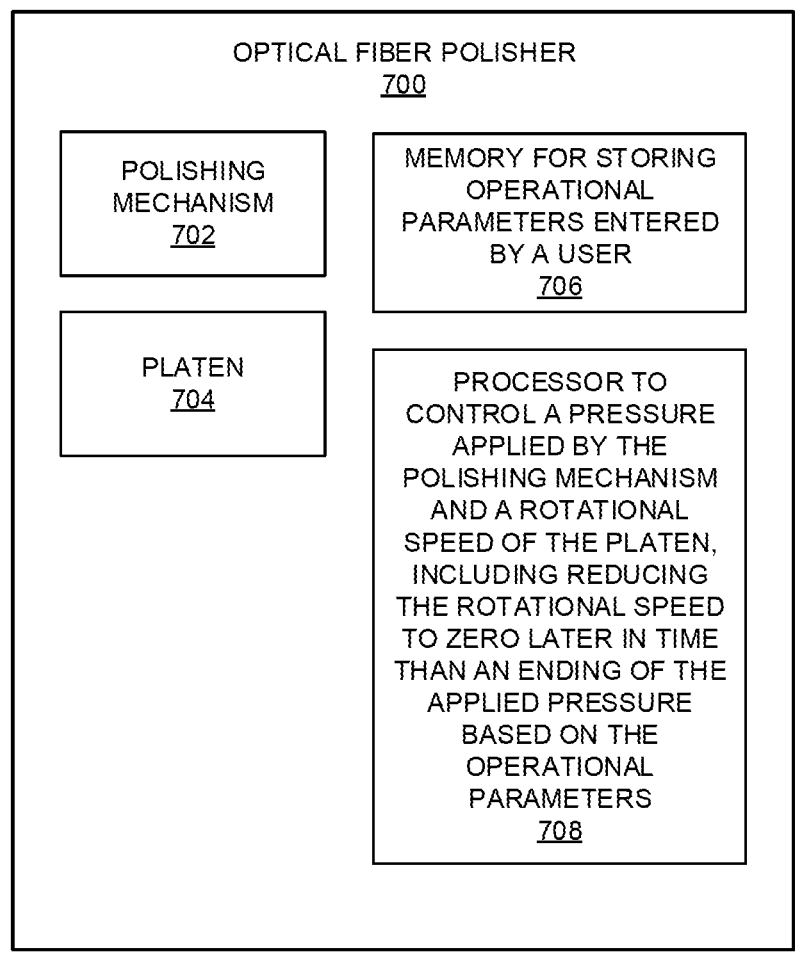
FIG. 7 is a block diagram illustrating an optical fiber polisher according to another embodiment.

Another embodiment of the present disclosure is directed to an optical fiber polisher. FIG. 7 is a block diagram illustrating an optical fiber polisher 700 according to another embodiment. Optical fiber polisher 700 includes a polishing mechanism 702, a platen 704, a memory 706 for storing operational parameters entered by a user, and a processor 708 to control a pressure applied by the polishing mechanism and a rotational speed of the platen, including reducing the rotational speed to zero later in time than an ending of the applied pressure based on the operational parameters.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof.

The invention claimed is:

1. An optical fiber polisher, comprising:
a polishing mechanism;
a platen;
a memory for storing operational parameters entered by a user; and
a processor to control a pressure applied by the polishing mechanism and a rotational speed of the platen, including causing a ramping down of at least one of the pressure and the rotational speed based on the operational parameters.

2. The optical fiber polisher of claim 1, wherein the processor causes a ramping down of the pressure based on the operational parameters.

3. The optical fiber polisher of claim 1, wherein the processor causes a ramping down of the rotational speed based on the operational parameters.

4. The optical fiber polisher of claim 1, wherein the processor causes a ramping down of both the pressure and the rotational speed based on the operational parameters.

5. The optical fiber polisher of claim 4, wherein the operational parameters include a speed ramp down time, and wherein the processor causes the ramping down of the rotational speed over a time period defined by the speed ramp down time.

6. The optical fiber polisher of claim 4, wherein the operational parameters include a pressure ramp down time, and wherein the processor causes the ramping down of the pressure over a time period defined by the pressure ramp down time.

7. The optical fiber polisher of claim 4, wherein the operational parameters include a delay parameter, and wherein the processor causes an ending of the ramping down of the rotational speed to occur later in time than an ending of the ramping down of the pressure based on the delay parameter.

8. The optical fiber polisher of claim 1, wherein the processor causes a ramping up of the pressure and the rotational speed based on the operational parameters.

9. The optical fiber polisher of claim 8, wherein the operational parameters include a delay parameter, and wherein the processor causes a beginning of the ramping up of the pressure to occur later in time than a beginning of the ramping up of the rotational speed based on the delay parameter.

10. The optical fiber polisher of claim 1, wherein the operational parameters include a rotational motion direction parameter, and wherein the processor controls a rotational motion direction of the platen based on the rotational motion direction parameter.

11. The optical fiber polisher of claim 1, wherein the optical fiber polisher is configured to perform a polishing process in a plurality of polishing steps, and wherein each of the polishing steps includes a set of operational parameters that may vary from operational parameters of other ones of the polishing steps.

12. The optical fiber polisher of claim 11, wherein the set of operational parameters for each of the polishing steps includes a rotational motion direction parameter, and wherein the processor selects, for each of the polishing steps, either a clockwise rotation or a counterclockwise rotation of the platen based on the rotational motion direction parameter for that polishing step.

13. The optical fiber polisher of claim 11, wherein the set of operational parameters for at least a subset of the polishing steps includes an auto start parameter indicating whether that polishing step should start automatically upon completion of an immediately preceding polishing step.

14. A method, comprising:

storing, in a memory, operational parameters entered by a user; and controlling, with a processor, a pressure applied by a polishing mechanism of an optical fiber polisher and a rotational speed of a platen of the optical fiber polisher, including causing a ramping down of at least one of the pressure and the rotational speed based on the operational parameters.

15. The method of claim 14, wherein the operational parameters include a speed ramp down time, and wherein the method further comprises:

causing, with the processor, the ramping down of the rotational speed over a time period defined by the speed ramp down time.

16. The method of claim 14, wherein the operational parameters include a pressure ramp down time, and wherein the method further comprises:

causing, with the processor, the ramping down of the pressure over a time period defined by the pressure ramp down time.

17. The method of claim 14, wherein the operational parameters include a rotational motion direction parameter, and wherein the method further comprises:

controlling, with the processor, a rotational motion direction of the platen based on the rotational motion direction parameter.

18. The method of claim 14, wherein the optical fiber polisher is configured to perform a polishing process in a plurality of polishing steps, and wherein each of the polishing steps includes a set of operational parameters that may vary from operational parameters of other ones of the polishing steps, and wherein the set of operational parameters for at least a subset of the polishing steps includes an auto start parameter indicating whether that polishing step should start automatically upon completion of an immediately preceding polishing step.

* * * * *